United States Patent [19]

Watten

[11] Patent Number: 4,880,445
[45] Date of Patent: Nov. 14, 1989

[54] MULTIPLE STAGE GAS ABSORBER

[76] Inventor: Barnaby J. Watten, 1105 Rustic Ridge Rd., Auburn, Ala. 36830

[21] Appl. No.: 146,264

[22] Filed: Jan. 20, 1988

[51] Int. Cl.$^4$ .............................................. B01D 47/00
[52] U.S. Cl. ............................................ 55/68; 55/94; 55/86; 55/233; 55/247; 261/22; 261/121.1; 261/125
[58] Field of Search .......................... 55/68, 53, 93–95, 55/223, 86, 247; 261/121.1, 22, 125

[56] References Cited

U.S. PATENT DOCUMENTS

| | | | |
|---|---|---|---|
| 914,279 | 3/1909 | Hartord | 55/68 |
| 1,722,458 | 7/1929 | Baufre | 55/68 |
| 4,470,830 | 9/1984 | Aubert | 55/95 |
| 4,588,535 | 5/1986 | Foidl | 55/223 |
| 4,765,807 | 8/1988 | Henriksen | 55/68 |

FOREIGN PATENT DOCUMENTS

| | | | |
|---|---|---|---|
| 2440338 | 5/1980 | France | 119/3 |
| 565728 | 11/1944 | United Kingdom | 55/68 |

Primary Examiner—Bernard Nozick
Attorney, Agent, or Firm—Michael C. Smith

[57] ABSTRACT

Apparatus for and method of absorbing a gas into a liquid in a multiple stage absorption process wherein the gaseous products from each stage is reintroduced into fresh liquid in subsequent stages.

17 Claims, 1 Drawing Sheet

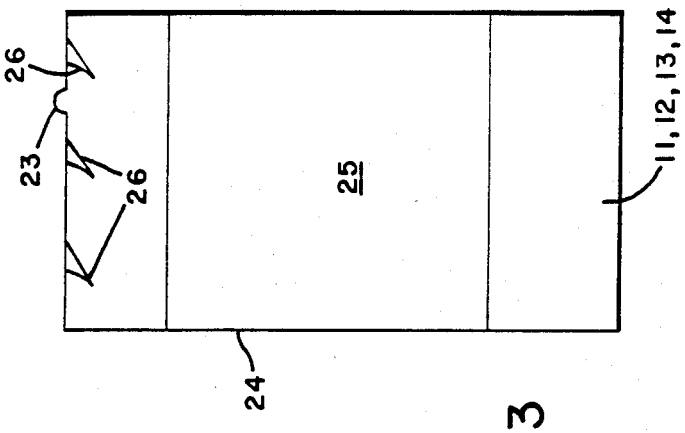
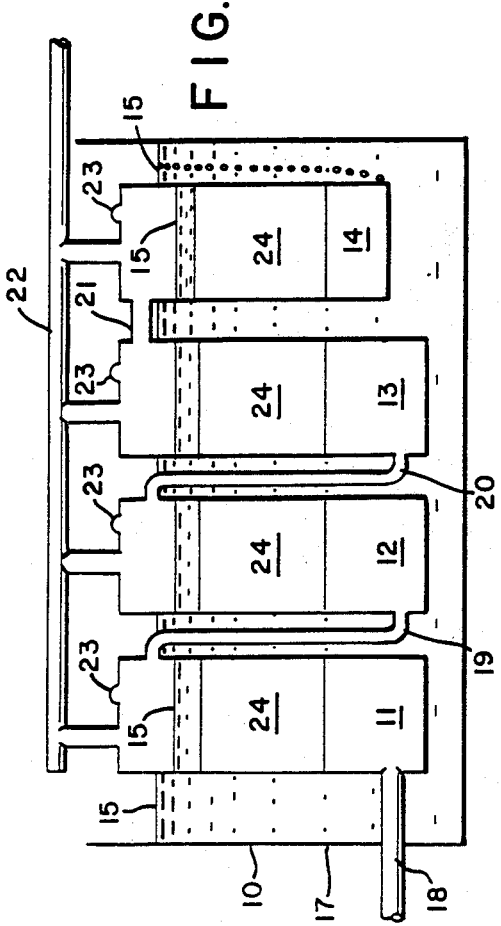
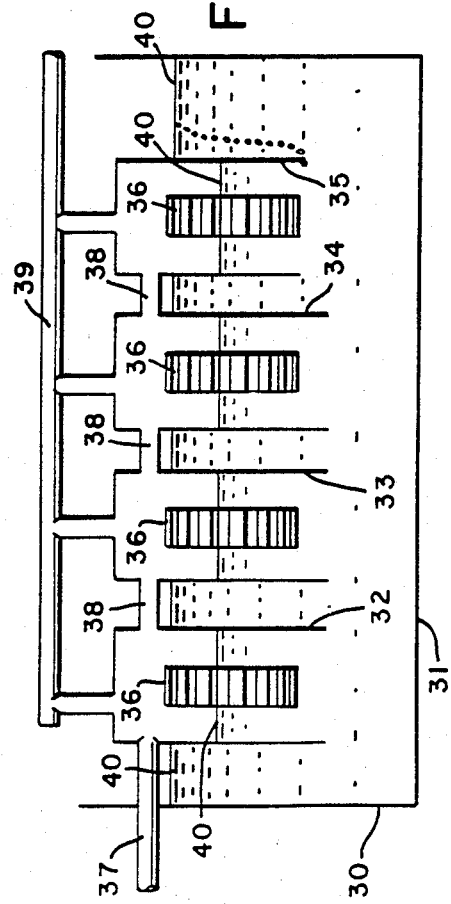

MULTIPLE STAGE GAS ABSORBER

TECHNICAL FIELD

The present invention relates generally to apparatus and method for absorbing a gas into a liquid, and specifically to apparatus and method for reintroducing gas effluent into a fresh liquid, and more specifically to apparatus and method for sequentially passing a volume of oxygen through a series of packed beds submerged in water wherein the oxygen is substantially absorbed into fresh water and waste gases such as nitrogen, argon and carbon dioxide are stripped from the water.

BACKGROUND ART

Gas absorption means are well known in the art. Examples are shown in U.S. Pat. Nos. 3,771,492; 3,996,893; 3,948,608; 3,116,712; 2,259,034; 3,255,731; and 4,116,164.

While the varieties of gas absorption means in the art are apparently well suited for their intended purposes, until the present invention there has been no apparatus and method for use in sequentially reintroducing a gas into a series of enclosed contact chambers receiving un-gassified liquids. As the gas is absorbed by the liquid, other gases are stripped from the liquid into the gas phase resulting in the need to purge contaminated gas continuously from the system. The contaminated gas is repeatedly reintroduced into fresh liquid to allow for absorption of substantially all available gas by a liquid. The use of relatively small contact chambers operating in parallel with regards to the liquid being treated, and in series in the gas phase, reduces the head required to achieve an acceptable degree of inlet gas absorption. It is for this reason that the present gas absorber was invented.

DISCLOSURE OF INVENTION

The present invention promotes absorption of substantially all inlet oxygen by water, for uses such as fish farming and waste treatment. It may also be used to enhance absorption of other gases by a liquid for other uses. The present invention is a multiple stage gas absorber having a plurality of containers, partially submerged in water, wherein oxygen is forced into the bottom of the first container, some of which is absorbed by the water while waste gases such as nitrogen, argon and carbon dioxide are stripped from the water, and are extracted as a waste gas effluent. The waste gas effluent is sequentially reintroduced to each container of fresh water until substantially all available oxygen is absorbed.

Thus, a primary object of the present invention is to provide apparatus and process for absorbing substantially all of a specific gas into a liquid.

Another major object of this invention is to provide a method and means for the absorption of substantially all available oxygen into water.

BRIEF DESCRIPTION OF THE DRAWINGS

While the specification concludes with claims particularly pointing out and distinctly claiming the subject matter which is regarded as the invention, it is believed that the invention, objects, features, and advantages thereof will be better understood from the following description taken in connection with the accompanied drawings in which like parts are given like identification numerals and wherein:

FIG. 1 is a schematic view of a first embodiment of the present invention with portions thereof removed for clarity;

FIG. 2 is a schematic view the self cleaning mechanism of the present invention; and FIG. 3 is a schematic view of a second embodiment of the present invention.

BEST MODE FOR CARRYING OUT THE INVENTION

For purposes of this specification, the following definitions will apply.

$B$ = Bunsen's coefficient at a given temperature and salinity,
$C$ = existing concentration of a gas in solution
$C^*$ = saturation concentration of a gas in solution
$dc/dt$ = change in concentration of a gas in solution with respect to time
$K_La$ = overall gas transfer coefficient
$d$ = diameter of a gas molecule (A)
$K$ = ratio of molecular weight to molecular volume for a gas
$X$ = mole fraction of the gas in the gas phase
$P_v$ = vapor pressure of water
$P_t$ = total pressure Referring now to FIG. 1, a first preferred embodiment 10, uses a series of packed columns 11, 12, 13, 14. As used herein, packed beds are defined as sealed columns packed with particles of high specific surface area. The packing used is available in several different sizes, shapes and materials. Liquid entering the column is distributed uniformly over the packing surface via a nozzle or perforated plate. The design of packed columns for degassing applications is described in an article entitled Design of Packed Columns for Degassing by John Colt and Gerald Bouck which appear at Aquacultural Engineering 3 (1984) pages 251–273, published by Elsevier Applied Science Publishers.

Absorber 10 comprises a large liquid container 17, a series of packed columns 11, 12, 13, 14, a gas introduction pipe 18, a series of gas effluent reintroduction pipes 19, 20, 21 sequentially connecting each column 11, 12, 13, 14, and a liquid supply manifold 22 for continuously supplying fresh liquid to all columns 11, 12, 13, 14. Container 17 is substantially filled with water 15. Each column 11, 12, 13, 14 is constructed in a non-permeable manner which forms an enclosed top, and sides, with a pressure relief valve 23 at the top of each column 11, 12, 13 14. The columns 11, 12, 13, 14 are submerged in water 15 and a water seal is formed at the bottom of each column. Fresh water is continuously introduced (by pumping, by natural water flow or by other means wherein the head pressure is greater than the pressure drop across the system 10) into all columns 11, 12, 13, 14 through manifold 22, and substantially pure oxygen is continuously introduced into the first column 11 through pipe 18. The packed bed 24 within each column 11, 12, 13, 14 is designed to cause the water to have minimum film thickness and to promote maximum surface area for the absorption of oxygen. In this example, approximately 30% of the oxygen is absorbed by the water, in first column 11, and waste gases such as argon, nitrogen, and carbon dioxide are stripped from the water 15, replacing the oxygen and resulting in a contaminated effluent gas which is forced by incoming oxygen out of column 11, through reintroduction pipe 19 into second column 12. In second column 12, the effluent gas (@70% oxygen) is combined with fresh water from manifold 22. Since the fresh water has a higher capacity to accept oxygen exiting from the first column 11, about 20% of the total oxygen is stripped from the effluent gas in second column 12. Under pressure from the oxygen entering the first column 11, the 50% $O_2$ effluent gas exits column 12 and enters column 13, through reintroduction pipe 20, where about 10% of the total oxygen is absorbed in the manner as previously discussed, resulting in a 40% effluent gas which similarly proceeds through reintroduction pipe 21 to the final column 14. Another 10% of the total oxygen is absorbed by the fresh water in column 14. The reintroduction pipe 21 reintroduces the gas to the top of the final column 14 which is substantially shorter than the previous columns 11, 12, 13, and the final effluent gas simply bubbles out of the bottom of column 14. The multi-stage packed column absorber 10 offers the advantage of a high oxygen absorption efficiency with minimal head (energy) requirement. The configuration of this system is such that the gradient between the saturation level of dissolved oxygen (DO) in the water being treated and the ambient DO concentration is maintained so as to maximize oxygen transfer.

In a pure oxygen contact system, oxygen is transferred from the gas bubbles to the liquid phase. Concurrently, dissolved nitrogen, argon and carbon dioxide will be stripped from the liquid phase into the gas phase. The primary resistance to the movement of these gases is usually provided by the stagnant liquid film present at the interphase between the gas and the liquid (Lewis and Whitman, 1924). The rate at which transfer occurs is then proportional to the difference between the existing and saturation concentration of the gas in solution. In differential form, the relationship is expressed as:

$$dc/dt = K_L a(C^* - C); \quad \text{[Equation 1]}.$$

The overall transfer coefficient ($K_L a$) will reflect the conditions present in a specific gas-liquid contact system. Conditions of importance include turbulence, waste characteristics of the liquid, the extent of the gas-liquid interphase and temperature. Although each gas species in a contact system will have a unique value of $K_L a$, it has been established by E. C. Tsivoglou, et al. in 1965 in an article entitled Tracer Measurements Of AtmosphericReareation—1. Laboratory Studies published at pages 1343-1362 of volume 37 of the Journal Of The Water Pollution Control Federation that relative values for a specific gas pair are inversely proportional to their molecular diameter, i.e.:

$$(K_L a)_1/(K_L a)_2 = (d)_2/(d)_1; \quad \text{[Equation 2]}.$$

The relationship above, based on Einstein's law of diffusion, provides a convenient means of a establishing relative rates of gas transfer in a multicomponent system (eg. $N_2$, $O_2$ and $CO_2$). Nitrogen, the major dissolved gas component of national surface waters has a $K_L a$ representing 94% of that of oxygen. The saturation concentration of gas in solution ($C^*$) will influence the direction as well as the rate of gas transfer [equation 2]. The $C^*$ of a gas is a function of its partial pressure in the gas phase, liquid temperature, and liquid composition as related by Henry's law. In equation form:

$$C^* = BK1000(X(P_T - P_{h20})/760); \quad \text{[Equation 3]}.$$

The $C^*$ of oxygen in the multi-stage absorber described here is increased by increasing the mole fraction of $O_2$ in the gas-phase [equation 3]. $C^*$ is increased further by hydrostatic pressure [equation 3]. This pressurization is achieved by partially submerging each column 11, 12, 13, 14 (packed-bed) below water level in the vessel 17 receiving the absorber's effluent, as shown in FIG. 2. Gas pressure within the column 11, 12, 13, 14 is sufficient to keep water 15 from entering and flooding the packing 16. The increase in $C^*$ achieved serves to (1) accelerate the rate of gas transfer [equation 1], and (2) provide the capability of achieving an effluent dissolved gas level in excess of the air saturation concentration at local barometric pressure.

The gradient between $C^*$ and C necessary for gas transfer to occur [equation 1] is maintained by dividing the influent water flow into several portions, each of which is directed through an individual packed-bed 11, 12, 13, 14. All of the oxygen gas being metered into the system is initially directed through a single first column subsection 11. Some $O_2$ is absorbed by water passing through this segment 11. Concurrently, and in agreement with equation 3, nitrogen and other gases are stripped from solution into the gas phase. This stripping action results in a reduction in the oxygen purity level of the gas phase ($X_{O2}$ equation 4) which, in turn, reduces $C^*$ and the rate of 02 absorption. An equilibrium $X_{O2}$ will eventually be established. The gas continuously exiting this column 11 is directed into a second packed column 12 allowing more oxygen to be utilized as the gas is being exposed to fresh water that has not as yet been oxygenated. In this column 12 the mole fraction of $O_2$ drops further due again to gas stripping from solution. Since the gas will still have a $X_{O2}$ greater than air (21%), the gas from the second column 12 is directed through a third 13 and then a fourth 14. The number of column segments 11, 12, 13, 14 required to achieve an acceptable degree of $O_2$ absorption will be related to packing height, pressure, inlet gas flow, inlet dissolved gas concentrations etc. Because the gas is reused, the height of the packed bed can be kept low, thus minimizing the head (energy) required to operate the system.

In conventional packed bed $O_2$ absorbers, as described by R. E. Speece in 1981 in a paper entitled Management Of Dissolved Oxygen And Nitrogen In Fish Hatchery Waters found in the Proceedings Of The Bio-engineering Symposium For Fish Culture at pages 53-62, published by L. J. Allen and E. C. Kinney, Fish Culture Section of the American Fisheries Society and the Northeast Society of Conservation Engineers, Bethesda, Md., the gas enters a single column at the bottom of the packing and exits at the top. Water in turn enters the top of the column and exits the bottom. Operating in the conventional manner requires a head pressure or column height far in excess of that required by the low profile multi-stage configuration 10 for the same degree of $O_2$ utilization.

A third improvement offered by the multi-stage packed bed 10 is that provisions have been made so that the packing can be cleaned within the column 11, 12, 13, 14 to minimize labor requirements. Fixed beds 24, as shown by FIG. 2, with plastic packing 25 will act as a mechanical filters and will, at periodic intervals, require cleaning. Conventionally, this is achieved by removing the packing 25 from the bed 24 by hand. With the present system 10, removal of the packing 25 is not required. Each of the individual columns has been outfitted with a series of water nozzles 26 which direct a high velocity water jet tangentially and at a slight downward angle at the packing. During cleaning, the beds 11, 12, 13, 14 are taken off-line. Gas within the column is the bled out of valves 23 at the top of the packed-bed unit 11, 12, 13, 14. This serves to flood the beds 24 with water in which the columns 11, 12, 13, 14 have been partially submerged. The packing 25 is nearly buoyant when flooded. Thus, when the water nozzles 26 are activated, they cause the packing 25 to spin around the central axis as well as to move vertically up and down the column 11. The hydrostatic shearing forces imposed on the packing 25 by the action of the water jets, combined with mixing and particle contact, serve to dislodge entrapped particulate matter. This matter is purged from the bed 24 during the cleaning operation and upon the removal of water from the packing once the cleaning nozzles 26 have been turned off. Water is removed from the bed by introducing gas under pressure into the packed column subsections 11, 12, 13, 14. At this time, the water flow to the columns 11, 12, 13, 14 can be reestablished.

In situations where water quality is poor, having a high amount particulate matter, the present invention can be practiced without packing 25. The packing 25 can be removed, and water is sprayed from nozzles 26 into the unpacked column 24 creating a high surface area water droplet spray and creating turbulence in the existing water, thereby promoting absorption of the available oxygen.

As FIG. 3 of the drawings illustrates, the second preferred embodiment of the present multiple stage gas absorber 30, comprises a large liquid container 31, a series of enclosure hoods 32, 33, 34, 35, an agitation means 36 within each hood 32, 33, 34, 35, a gas introduction pipe 37, a series of gas effluent reintroduction pipes 38 sequentially connecting each hood 32, 33, 34, 35, and a liquid supply manifold 39 for continuously supplying fresh liquid to all hoods 32, 33, 34, 35. Fresh liquid may also be supplied without the use of manifold 39 in a passive water introduction environment such as a river or stream. The manifold 39 and the container 31 may also be eliminated in situations where this embodiment 30 is used in a pond or lake (the container 31 becomes a pond or lake), and the agitation means 36 such as a paddle wheel or an impeller induces flow of water into the hoods 32, 33, 34, 35. While other gases and liquids may be used, the primary use is for introducing oxygen into water. Container 31 is substantially filled with water 40. Hoods 32, 33, 34, and 35 are each constructed in a non-permeable manner which forms an enclosed top and sides, leaving only the bottom unenclosed. Since each hood 32, 33, 34, 35 is partially submerged in water 40, a water seal is formed at the bottom of each hood 32, 33, 34, 35. Fresh water is continuously introduced into all hoods 32, 33, 34, 35 through manifold 39, and substantially pure oxygen is continuously introduced into the first hood 32 through pipe 37. Rotary agitation means 36 such as a turbine surface areator or a paddle wheel surface areator are incorporated in each hood 32, 33, 34, 35 to cause the agitated water to have minimum liquid film thickness to promote maximum surface area for the absorption of oxygen. Approximately 30% of the oxygen is absorbed by the water in the first hood 32, and waste gases such as argon, nitrogen, and carbon dioxide are stripped from the water, replacing the oxygen, and resulting in a contaminated effluent gas which is forced by the incoming oxygen out of hood 32, through reintroduction pipe 38 into second hood 33. In second hood 33, the effluent gas (@70% oxygen) is agitated with fresh water, which has a higher capacity to accept oxygen from the contaminated gas than the water of the previous hood 32, and about 20% of the total oxygen is stripped from the effluent gas in the second hood 33. Under pressure from the oxygen entering the first hood 32, the 50% effluent gas exits hood 33 and enters hood 34 where about 10% of the total oxygen is absorbed in the manner as previously discussed, resulting in a 40% effluent gas which similarly proceeds to the last hood 35. As FIG. 3 illustrates, the previous hoods 32, 33, 34 extend deeper into the water 40 than does last hood 35, and last hood 35 has no exit pipe. The last hood 35 is shorter to allow gas to exit at the bottom of hood 35 before escaping the system at any other point, thereby elimating the need for compressors or other means to force the gas from one hood to the next. There is also no mechanical pressurizing means. As another 10% of the total oxygen is absorbed by the fresh water of the last hood 35, substantially all available oxygen has been extracted, and the final effluent simply bubbles out the bottom of hood 35.

While this invention has been described in detail with particular reference to a preferred embodiment thereof, it will be understood that variations and modifications can be effective within the spirit and scope of the invention as described hereinbefore and as defined in the appended claims.

INDUSTRIAL APPLICABILITY

This invention is capable of exploitation in the chemical industry and is particularly useful in an application where gas is moved into a liquid, such as aquaculture, waste water treatment, and chemical processing.

I claim:

1. Apparatus for absorbing oxygen into water comprising:
   (a) a container of water;
   (b) two or more absorption compartments partially submerged in said water within said container;
   (c) means for introducing fresh water into each of said compartments;
   (d) means for introducing fresh oxygen under pressure into a first of said absorption compartments;
   (e) means for causing absorption of said oxygen into said water located in each of said compartments;
   (f) means for removing absorbed oxygen and water which has absorbed said oxygen from each of said compartments;
   (g) means for moving non-absorbed oxygen from each of said compartments to a subsequent compartment, in series therewith;
   (h) means for moving non-absorbed oxygen and waste gas from a last of said compartments; and
   (i) means for removing oxygen saturated water from said container.

2. Apparatus of claim 1 wherein each of said absorption compartments comprises a non-permeable, water tight top and sides, and an open bottom, providing a liquid seal at the bottom of each compartment when said water is in said container.

3. The apparatus of claim 2 wherein said means for causing absorption comprises means for causing said water to have a minimum film thickness and thereby causing the water to have a maximum surface area for oxygen absorption.

4. The apparatus of claim 3 wherein said means for causing minimum film thickness and maximum surface area is a packed bed comprising a sealed column packed with particles having high specific surface area over which said water is uniformly distributed by a spray nozzle or perforated spray plate.

5. The apparatus of claim 3 wherein said means for causing minimum film thickness and maximum surface area is a surface areator comprising rotatable impeller for breaking the surface of said liquid and mixing said liquid and gas.

6. The apparatus of claim 3 wherein said means for causing minimum film thickness and maximum surface area is a surface aerator comprising a paddle wheel which rotates about a horizontal axis parallel with the surface of the liquid, breaking the surface of the liquid and mixing the liquid with the gas.

7. The apparatus of claim 3 wherein said means for causing minimum film thickness and maximum surface area comprises a plurality of high velocity spray nozzles which spray fresh water into the subject liquid, thereby breaking its surface and causing mixing of the water and the oxygen.

8. The apparatus of claim 3 wherein said means for introducing fresh water comprises a manifold connected to the top of each of said compartments.

9. The apparatus of claim 3 wherein said means for removing water from each compartment is the open bottom of each compartment.

10. The apparatus of claim 3 wherein the top surfaces of all compartments are in the same horizontal plane, the bottoms of all compartments except the last compartment are in the same horizontal plane, and the bottom of the last compartment is higher than the bottoms of the previous compartments.

11. The apparatus of claim 3 wherein the means for removing the oxygen and waste gas from the last compartment comprises alignment of the bottom of the last compartment at an elevation higher than all previous compartments.

12. The apparatus of claim 3 wherein said means for introducing fresh oxygen into said first absorption compartment chamber comprises a pipe connected to said chamber.

13. The apparatus of claim 12 comprising a pipe connected to said first compartment near its bottom.

14. The apparatus of claim 3 wherein said means for moving non-absorbed oxygen and waste gas from each compartment to a subsequent compartment in series is a series of pipes, each interconnecting a previous compartment and a subsequent compartment.

15. The apparatus of claim 14 wherein each of said pipes is connected to the previous compartment near its top and is connected to the subsequent compartment near its bottom.

16. The apparatus of claim 15 wherein the pipe connecting to the last compartment is connected to the last compartment near its top.

17. A method for absorbing oxygen into water comprising the steps of introducing relatively pure oxygen and relatively pure water into a first compartment; absorbing about 30% of the oxygen into the water; moving the effluent gaseous products of said first absorption to a second compartment; introducing relatively pure water into the second compartment; absorbing about 20% of the original relatively pure oxygen into the water; moving the effluent gaseous products of the second absorption to a third compartment; introducing relatively pure water into the third compartment; absorbing about 10% of the oxygen into the water; moving the effluent gaseous products of the third absorption to a fourth compartment; introducing relatively pure water into the fourth compartment; absorbing about 10% of the oxygen into the water; and recovering the water having the absorbed oxygen.

* * * * *